United States Patent [19]

Royer

[11] Patent Number: 4,693,321

[45] Date of Patent: Sep. 15, 1987

[54] METHOD USING ENCAPSULATED FLOW IMPROVERS TO REDUCE TURBULENCE

[75] Inventor: D. Jack Royer, Ponca City, Okla.

[73] Assignee: Conoco Inc., Wilmington, Del.

[21] Appl. No.: 799,070

[22] Filed: Nov. 18, 1985

[51] Int. Cl.$^4$ ............................................. F17D 1/16
[52] U.S. Cl. .................................. 137/13; 252/8.551; 428/402.24
[58] Field of Search ...................... 252/8.55 R, 8.551; 428/402.24; 137/13

[56] References Cited

U.S. PATENT DOCUMENTS

| | | | |
|---|---|---|---|
| 3,079,351 | 2/1963 | Staneslow et al. | 428/914 X |
| 3,215,154 | 11/1965 | White et al. | 137/13 |
| 3,265,630 | 8/1966 | Jensen | 428/402.24 |
| 3,466,242 | 9/1969 | McClaflin et al. | 252/8.55 R |
| 3,493,000 | 2/1970 | Canevari et al. | 137/13 |
| 3,669,722 | 6/1972 | Bishop | 428/402 |
| 4,087,376 | 5/1978 | Foris et al. | 428/402.24 X |
| 4,190,069 | 2/1980 | Krantz | 137/13 |

Primary Examiner—Richard D. Lovering
Attorney, Agent, or Firm—Cortlan R. Schupbach

[57] ABSTRACT

Polymeric flow improvers, whether alone or partially dissolved in a solvent, are encapsulated to provide a free flowing particulate powder which can be easily transported and subsequently placed into hydrocarbons wherein the outer shelf of the encapsules are subjected to melting, shear, dissolution, or the contents may be leached out to place the flow improver into intimate contact with the flowing hydrocarbons in a dispersed form such that drag reduction is immediate and effective. Optionally, the size of the particulate matter and the thickness of the encapsulating material are varied such that constant or delayed release of flow improver occurs as the hydrocarbon fluid is transported through conduits.

9 Claims, No Drawings

METHOD USING ENCAPSULATED FLOW IMPROVERS TO REDUCE TURBULENCE

The present invention relates to compositions and methods for placing materials capable of reducing friction loss in flowing hydrocarbon fluids through conduits into contact with said hydrocarbons.

BACKGROUND OF THE INVENTION

Energy required to move fluids from one location to another by a conduit or pipe is dependent upon the viscosity of the fluid, diameter of the pipe, and many other factors. The pressure in the conduit immediately adjacent the discharge side of a pump is greater than the pressure further along the conduit downstream of the pump. Part of this difference in pressure, or pressure drop, is due to friction loss or drag and is more pronounced the faster the fluid flows.

Many methods have been known for reducing the friction loss or drag of fluids flowing through conduits. Primarily, such methods for hydrocarbon transport include the use of additives known as drag reducers as presented by materials such as polyisobutylene or higher molecular weight polyalphaolefins. Generally such additives are added to the flowing hydrocarbon or as an 8–12 weight percent active solution of the additive which dissolves in the flowing hydrocarbon fluid.

Most friction loss control additives work well so long as they are not subjected to excessive shear once dissolved in the flowing hydrocarbon. Mere passage of the liquid through a conduit when the fluid is in the early stages of turbulent flow is not particularly detrimental. However, in most pipeline applications, with increasing turbulent flow and especially when passing through a pump utilized to move the hydrocarbon fluid, these polymeric drag reducers are known to shear and severely degrade the flow improving additives.

These flow improving additives are normally non-crystalline, hydrocarbon soluble polymers which have a molecular weight above about $1 \times 10^6$ and which are capable of reducing turbulent flow in such flowing hydrocarbons. Such materials are very tacky, tend to reagglomerate, and normally are handled as partially dissolved, low active, extremely viscous solutions. However, the cost of moving the dissolved solution over great distances to where drag reduction injection is needed is expensive and requires specialized transportation and pumping equipment.

Although it is possible to ship such polymers in bulk and convert such polymers to master batch partially dissolved solutions at the injection site, typically using part of the pipeline contents as solvent, in practical terms the number of separate dissolving machines or storage vessels and cost of dissolving bulk polymers becomes prohibitive. Economically, it is strongly preferred to employ a higher active, formulated product ready for injection, rather than to be involved with bulk polymer dissolving operations.

Grinding such polymer products into fine resins prior to transportation to form particles which dissolve more readily is prohibited by the extreme reagglomeration tendencies of such polymers. If the polymers are even partially dissolved to prevent such reagglomeration, milling provides high risk of shear degradation of the polymer. In addition, finely divided polymer particles increase the probability of polymer oxidation, which lowers the molecular weight and thus the drag reduction efficiency of the polymer.

It would therefore be of great benefit to provide a method whereby such polymers could be placed into a form which is easily handled, protected from oxidation inexpensively shipped and yet dissolve readily at the point of injection such that drag reduction can be obtained. In addition, controlling dissolution at a point in the pipeline downstream of the injection point would be greatly desirable.

I have now discovered that high molecular weight, non-crystalline polymers can be placed in such a form by micro encapsulation techniques which are known to those skilled in the art, transported to the point of use as a free-flowing particulate material, and then placed into contact with the flowing hydrocarbon fluid by mechanical shearing, dissolving, leaching or melting the encapsulating material or a combination of these. In addition, the encapsulating material can be utilized to produce particles of varying particle size, wall thicknesses or a combination of these, such that the flow improving properties of the encapsulated polymer material can be realized for very rapid release or for controlled release, by temperature, shear or both temperature and shear, as the hydrocarbon fluid flows through conduits.

The prior art is aware of methods for preparing microcapsules by polymerizing urea and formaldehyde in the presence of various materials to form a wall membrane of a urea formaldehyde resin around droplets of hydrophobic oily liquids as proposed in U.S. Pat. No. 4,356,109. In addition, U.S. Pat. No. 4,001,140 discloses a process for performing encapsulations by an in-situ polymerization reaction to yield capsule wall material. The polymerization reacts urea and formaldehyde in an aqueous vehicle and allows manufacture of microcapsules at high concentrations.

U.S. Pat. No. 3,928,230 relates to the microencapsulation of fluids and solids, utilizing capsules having walls of epoxy and similar polymers. However, such encapsulating wall materials would be difficult to use in the present invention since the present invention depends upon the capsule shearing, capsule solubility, or capsules having a sufficiently low melting temperature such that the contents can be placed into contact with flowing hydrocarbons. U.S. Pat. No. 4,221,710 discloses that in the film art, microcapsules can be prepared by polymerizing urea and formaldehyde in the presence of arabic gum to form a urea formaldehyde resin wall around a previously dispersed hydrophobic oily solution. The method is used to provide pressure sensitive recording sheets.

DESCRIPTION OF THE INSTANT INVENTION

The instant invention provides a method for utilizing non-crystalline hydrocarbon soluble polymeric flow improvers capable of reducing turbulence in hydrocarbons flowing through conduits comprising (a) encapsulating said flow improver to form free flowing particles;

(b) placing said encapsulated flow improver into contact with hydrocarbons then (c) placing the flow improver in intimate contact with the flowing hydrocarbon by at least one method selected from the group consisting of mechanical fracturing of the encapsulating material, heating said hydrocarbon to above about 270° C. to melt the encapsulating material and place the flow improver in direct contact with the flowing hydrocarbon, dissolving the polymer coating, or leaching the contents from the capsule. Any one or a combination of these methods will place the flow improver in direct contact with the flowing hydrocarbon.

The flow improvers to be encapsulated in the process of the present invention can be either a dry solid or partially dissolved as a viscous liquid. For purposes of conserving transportation costs, it is preferred that such materials to be encapsulated are dry, polymeric material. However, most flow improving polymers are produced as a partially dissolved solution having an extreme viscosity and tendency to cold flow, and such materials when dispersed in an aqueous solution can be encapsulated much more easily without the necessity of removing solvent and such method is preferred.

Normally, the encapsulated flow improver particles will have varying sizes, ranging from about 15 microns to about ⅛ of an inch. Use of varying sizes allows the flow improver to be exposed to the hydrocarbon flowing through the conduits as a series of particles or droplets of varying size, thus allowing controlled dissolution and effectiveness in the flowing hydrocarbon to occur over a period of time as the hydrocarbon moves through the conduit. For example, use of smaller particles produces increases in the surface area of dispersed flow improver prior to dissolution as compared to bulk polymers, and surface area increases estimated at 1,000 to 10,000 times that obtained with current methods of pipeline injection. As a result, very rapid dissolution can be obtained. Larger particles can be used to provide dissolution later in the pipeline section or even in downstream sections subsequent to pumping stations if desired. Since such flow improvers are not highly vulnerable to shear until dissolved, such use of the flow improver allows the passage of non-dissolved particles through various pumps without severe loss of flow improving ability by degradation, since additional polymer will dissolve downstream of the pump. The pumps themselves can be utilized to further fracture encapsulated flow improver and expose flow improver to the hydrocarbon flowing through the conduit.

Although a variety of encapsulating means can be used, the most preferred means is the use of a urea formaldehyde resin, whether used to encapsulate a dry polymer or a partially dissolved polymer solution. In certain situations, petroleum wax is a useful encapsulating material. The wax of course should be insoluble in the encapsulated material such as solid flow improver. Waxes may be made hydrocarbon insoluble by modification with ethylvinyl acetate or polyethylene, and therefore become generally useful to encapsulate oil containing materials. Simple heating will melt the wax and release capsule contents, since the melting point of such waxes normally range from about 140° F. to about 180° F. The use of such waxes would permit bulk handling under most circumstances. Use of other materials such as epoxy coating is not as preferred, since these materials are normally more difficult to shear. However, such materials can be used if the encapsulated flow improving polymer was sufficiently treated to rupture the capsules such that the flow improving polymer is placed in direct contact with the hydrocarbons flowing through the conduit.

In a preferred method of the present invention, a urea formaldehyde encapsulated flow improving polymer will, at the injection site, be placed into a holding tank containing as a "carrier" a portion of the flowing hydrocarbon. Encapsulated flow improver will be placed into this flowing hydrocarbon in an agitated tank, and a portion of the contents injected into the pipeline. In doing this, the slurry is pumped and heated to a temperature sufficiently high to melt the encapsulating urea formaldehyde resin, normally such temperatures being at least about 270° C. The hydrocarbon containing concentrated flow improver is metered into the main flowing stream at a concentration sufficient to impart the desired drag reducing characteristics.

Using the process of the present invention, when the urea formaldehyde coating around the flow improver is controlled sufficiently that mechanical fracturing can occur, it is of course preferred to directly place the encapsulated flow improvers into a conduit containing flowing hydrocarbons under short term turbulent flow conditions, and allowing the encapsulating urea formaldehyde resin to be ruptured by the passage through various pumps, contact with the wall, valves, and the like. Larger flow improver particles, require some time to dissolve and produce flow improvement downstream of the short term shear point, and in an undissolved state the flow improver is not very vulnerable to shear degradation.

When encapsulating the flow improving polymers of the present invention, it is preferred that such materials be non-crystalline hydrocarbon soluble polymeric flow improvers which have a molecular weight above about $1 \times 10^6$ and which are capable of reducing turbulent flow and hydrocarbons flowing through conduits.

It will be realized by those skilled in the art that the rate of dissolution of such solid flow improving polymers in the flowing hydrocarbon is a function of particle size turbulent flow conditions, and temperature of the flowing hydrocarbon wherein smaller particles dissolve more rapidly. However, it can be generally stated that the process of the present invention allows wide flexibility in the insertion of such flow improvers into the conduits containing flowing hydrocarbons, and will allow the user to maximize the effectiveness of such flow improvers.

The instant invention is more completely described with reference to the examples below wherein all parts and percentages are by weight unless otherwise specified. The examples provided are to illustrate the present invention and not to limit it.

EXAMPLE

A reaction vessel is charged with 100 pounds of a 10 percent aqueous solution of an anionic polyectrolyte such as the copolymer of vinyl acetate and maleic anhydride (45 mole percent maleic anhydride; copolymer average molecular weight of about 250,000). Added to the agitated solution are 10 parts of urea and 1 part of resorcinol. The pH of the mixture is adjusted to 3.5 using a 20 percent aqueous sodium hydroxide solution.

An oil-in-water emulsion is created by adding 100 parts of a 10 percent active flow improver solution containing a hydrocarbon solvent. Vigorous agitation is stopped when the average flow improver droplet size reaches about 30–50 microns.

Next, polymerization may be catalyzed by the addition of ammonium salts (e.g. 200 parts of a 1 percent aqueous ammonium chloride solution). Alternatively, polymerization can be conducted in an uncatalyzed system in which 200 parts of water is added prior to the preceding pH adjustment. The polymerization step itself is begun with the stirred addition of 25 parts of a 37 percent formaldehyde solution and raising the reaction mixture to 50° to 60° C for 1-2 hours. The mixture is then cooled to ambient conditions. Water is evaporated from the system to produce a dry encapsulated product.

Following delivery to the pipeline site, the encapsulated product may be injected into the pipeline material by one of several methods. A preferred method for injecting urea formaldehyde encapsulated flow improver into crude oil is to use a continuous, small sidestream of the pipeline contents as a carrier fluid for the micro capsules, followed by subsequent release of the flow improver and injection of the sidestream back into the pipeline. Release of the encapsulated flow improver is accomplished by depressurizing a small sidestream into a stirred vessel together with encapsulated product. A metered portion of the contents are subsequently pressured to pipeline pressure, heated briefly in a hot zone in the injection line to decompose the capsule shell and to release the flow improver into the carrier fluid, then injected into the pipeline. A residence time of about 3 to 5 minutes at a temperature of about 300° C. is typically sufficient to release the flow improver into the carrier fluid. The amount of sidestream diverted to act as the carrier fluid and the concentration of the encapsulated flow improver released into that material is determined for the specific application, being typically set by convenient vessel and pump sizes. The desired goal is the insertion of normally 5 to 50 ppm by weight of active flow improver into the pipeline contents.

While certain embodiments and details have been shown for the purpose of illustrating this invention, it will be apparent to those skilled in this art that various changes and modifications may be made herein without departing from the spirit or scope of the invention.

I claim:

1. A method for using non-crystalline hydrocarbon soluble polymeric flow improvers capable of reducing turbulence in hydrocarbons flowing through conduits, comprising (a) encapsulating said flow improver to form free-flowing particles, consisting essentially of normally noncrystalline, hydrocarbon soluble polymers having a molecular weight above $1 \times 10^6$ (b) placing said encapsulated flow improver in contact with the hydrocarbon, then (c) placing the flow improver into intimate contact with said hydrocarbon by mechanical fracturing, melting, leaching or dissolution of the encapsulating material.

2. A method as described in claim 1 wherein the encapsulated flow improver contains solvent in addition to the flow improving polymer.

3. A method as described in claim 2 wherein the encapsulated flow improver particle size ranges from about 15 microns to about $\frac{1}{8}$ inch.

4. A method as described in claim 3 wherein flow improvers are encapsulated in a material selected from the group consisting of polyurea formaldehyde-resins, hydrocarbon waxes, ethylene-modified waxes and ethyl vinyl acetatemodified waxes, and amino resins.

5. A method as described in claim 4 wherein the encapsulated flow improver is placed into contact with hydrocarbons before insertion into a conduit containing flowing hydrocarbons.

6. A method as described in claim 4 wherein the encapsulated flow improver is placed into contact with hydrocarbons in a sidestream taken from the flowing hydrocarbon conduit, heated to a temperature capable of melting the encapsulated material, exposing the flow improver to the hydrocarbons, then returning the flow improver/hydrocarbon mixture to the conduit containing flowing hydrocarbons.

7. A method as described in claim 4 wherein the encapsulated flow improver is placed directly into a conduit containing flowing hydrocarbons under turbulent flow conditions.

8. A method as described in claim 7 wherein the flowing hydrocarbon conduit contains an area of short term high shear in order to provide mechanical fracturing to the encapsulated flow improvement.

9. A method as described in claim 4 wherein the encapsulated flow improver is leached from within the encapsulating material while in the conduit containing flowing hydrocarbons.

* * * * *